United States Patent
Hofmann et al.

(10) Patent No.: US 11,065,813 B2
(45) Date of Patent: Jul. 20, 2021

(54) APPARATUS FOR ADDITIVELY MANUFACTURING THREE-DIMENSIONAL OBJECTS

(71) Applicant: CL SCHUTZRECHTSVERWALTUNGS GMBH, Lichtenfels (DE)

(72) Inventors: Alexander Hofmann, Weismain (DE); Christian Diller, Lichtenfels (DE); Ulrich Albanus, Coburg (DE); Payam Daneschwar, Memmelsdorf (DE)

(73) Assignee: CONCEPT LASER GMBH, Lichtenfels (DE)

( * ) Notice: Subject to any disclaimer, the term of this patent is extended or adjusted under 35 U.S.C. 154(b) by 58 days.

(21) Appl. No.: 16/022,538

(22) Filed: Jun. 28, 2018

(65) Prior Publication Data
US 2019/0022940 A1  Jan. 24, 2019

(30) Foreign Application Priority Data
Jul. 21, 2017 (EP) .................... 17182649

(51) Int. Cl.
*B29C 64/268* (2017.01)
*B29C 64/30* (2017.01)
(Continued)

(52) U.S. Cl.
CPC .......... *B29C 64/268* (2017.08); *B29C 64/153* (2017.08); *B29C 64/159* (2017.08);
(Continued)

(58) Field of Classification Search
CPC ............ B01D 46/0002; B01D 46/0041; B01D 46/0083; B01D 46/10; B01D 46/48;
(Continued)

(56) References Cited

U.S. PATENT DOCUMENTS

| 4,080,431 A | * | 3/1978 | Moss | ................... | C01B 21/064 423/289 |
| 2004/0012112 A1 | * | 1/2004 | Davidson | ............... | B33Y 10/00 264/109 |

(Continued)

FOREIGN PATENT DOCUMENTS

| CN | 102171071 A | 8/2011 |
| CN | 105382257 A | 3/2016 |

(Continued)

OTHER PUBLICATIONS

European Search Report EP Application No. 191521731 dated Dec. 2, 2019.
(Continued)

*Primary Examiner* — Joseph S Del Sole
*Assistant Examiner* — Manley L Cummins, IV
(74) *Attorney, Agent, or Firm* — Dority & Manning, P.A.

(57) ABSTRACT

Apparatus (1) for additively manufacturing of three-dimensional objects by means of successive layerwise selective irradiation and consolidation of layers of a build material which can be consolidated by means of an energy beam, with a stream generating unit (2) configured to generate a stream of a process gas (3) being capable of being charged with particles (4), in particular non-consolidated particulate build material and/or smoke and/or smoke residues, generated during operation of the apparatus (1) and a filter unit (5) configured to separate particles (4) from the stream of process gas (3), wherein the filter unit (5) comprises a filter chamber (6) with at least one filter element (7) at least partly arranged in the streaming path of the generated stream of process gas (3), wherein particles (4) in the stream of process gas (3) are separated from the process gas (3) by the filter element (7).

11 Claims, 3 Drawing Sheets

(51) Int. Cl.
| | |
|---|---|
| *B33Y 30/00* | (2015.01) |
| *B33Y 40/00* | (2020.01) |
| *B29C 64/153* | (2017.01) |
| *B33Y 10/00* | (2015.01) |
| *B29C 64/371* | (2017.01) |
| *B29C 64/259* | (2017.01) |
| *B29C 64/159* | (2017.01) |
| *B29C 64/188* | (2017.01) |
| *B29C 64/209* | (2017.01) |
| *B29C 64/227* | (2017.01) |
| *B01D 46/00* | (2006.01) |
| *B01D 46/48* | (2006.01) |
| *B22F 12/00* | (2021.01) |

(52) U.S. Cl.
CPC .......... *B29C 64/188* (2017.08); *B29C 64/209* (2017.08); *B29C 64/227* (2017.08); *B29C 64/259* (2017.08); *B29C 64/30* (2017.08); *B29C 64/371* (2017.08); *B33Y 10/00* (2014.12); *B33Y 30/00* (2014.12); *B33Y 40/00* (2014.12); *B01D 46/0083* (2013.01); *B01D 46/48* (2013.01); *B22F 12/00* (2021.01)

(58) Field of Classification Search
CPC .......... B22F 10/00; B22F 10/20; B22F 10/28; B22F 10/70; B22F 12/00; B29C 64/124; B29C 64/153; B29C 64/159; B29C 64/165; B29C 64/188; B29C 64/209; B29C 64/227; B29C 64/25; B29C 64/255; B29C 64/259; B29C 64/264; B29C 64/268; B29C 64/30; B29C 64/357; B29C 64/364; B29C 64/371; B33Y 10/00; B33Y 30/00; B33Y 40/00; Y02P 10/25
See application file for complete search history.

(56) References Cited

U.S. PATENT DOCUMENTS

| | | | |
|---|---|---|---|
| 2005/0116391 A1* | 6/2005 | Lindemann | B29C 64/153 |
| | | | 264/497 |
| 2011/0265893 A1* | 11/2011 | Scott | B33Y 99/00 |
| | | | 137/544 |
| 2013/0052291 A1* | 2/2013 | Morikawa | B29C 64/153 |
| | | | 425/135 |
| 2014/0287080 A1 | 9/2014 | Scott et al. | |
| 2016/0059310 A1 | 3/2016 | Junker et al. | |
| 2017/0157859 A1 | 6/2017 | Mahdavi et al. | |
| 2017/0348771 A1* | 12/2017 | Kawada | B33Y 30/00 |
| 2018/0111319 A1* | 4/2018 | Brezoczky | B23K 26/14 |
| 2018/0133963 A1* | 5/2018 | Bechmann | B29C 64/259 |
| 2018/0297283 A1* | 10/2018 | Hagedorn | B29C 64/343 |

FOREIGN PATENT DOCUMENTS

| | | |
|---|---|---|
| DE | 102014207160 A1 | 10/2015 |
| EP | 2774703 A1 | 9/2014 |
| JP | H0341775 Y2 | 9/1991 |
| JP | 2005/074931 A | 3/2005 |
| JP | 2006/248231 A | 9/2006 |
| JP | 2012/501828 A | 1/2012 |
| JP | 2016/052778 A | 4/2016 |
| JP | 2016/056417 A | 4/2016 |
| WO | 2009029973 A2 | 3/2009 |

OTHER PUBLICATIONS

European Search Report Corresponding to Application No. 17182649 dated Jan. 29, 2018.
Combined Chinese Search Report and Office Action Corresponding to Application No. 201711011915 dated Jul. 1, 2020.
Machine Translated Japanese Search Report Corresponding to Application No. 2019163724 dated Sep. 17, 2020.

* cited by examiner

APPARATUS FOR ADDITIVELY MANUFACTURING THREE-DIMENSIONAL OBJECTS

CROSS-REFERENCE TO RELATED APPLICATIONS

This application claims priority to European Patent Application serial no. 17 182 649.8 filed Jul. 21, 2017, the contents of which are incorporated herein by reference in their entirety as if set forth verbatim.

DESCRIPTION

The invention relates to an apparatus for additively manufacturing three-dimensional objects by means of successive layerwise selective irradiation and consolidation of layers of a build material which can be consolidated by means of an energy beam, with a stream generating unit configured to generate a stream of a process gas being capable of being charged with particles, in particular non-consolidated particulate build material and/or smoke and/or smoke residues, generated during operation of the apparatus and a filter unit configured to separate particles from the stream of process gas, wherein the filter unit comprises a filter chamber with at least one filter element at least partly arranged in the streaming path of the generated stream of process gas, wherein particles in the stream of process gas are separated from the process gas by the filter element.

Respective apparatuses for additively manufacturing three-dimensional objects are widely known and may be embodied as selective laser sintering apparatuses, selective laser melting apparatuses or selective electron beam melting apparatuses, for instance.

During operation of respective additive manufacturing apparatuses, an efficient removal of particles, such as non-consolidated particulate build material, particularly smoke or smoke residues, generated during operation of the apparatuses, without raising build material particles from the powder bed, which is a decisive factor for the quality of the object to be manufactured, can be challenging. In other words, the stream generating devices of respective apparatuses should be configured to generate a gaseous fluid stream which, while streaming through the process chamber, on the one hand efficiently removes non-consolidated build material particles from the process chamber and on the other hand avoids raising build material particles from the powder bed. This particularly, applies to additive manufacturing apparatus implementing high power energy beams, e.g. energy beams having a power of more than 210 W.

Further, it is a task of filter units of respective additive manufacturing apparatuses to separate particles contained or charged in the process gas from the stream of process gas to ensure that only clean process gas is recycled into the process chamber and can again be charged with particles generated during the operation of the apparatus. Thus, only process gas free from respective particles is streamed into the process chamber, avoiding a contamination of the build process by particles in the process gas. Particles separated from the process gas typically accumulate on the filter element and/or in the filter chamber. Therefore, it is necessary that the filter element and/or the filter chamber is cleaned or replaced which leads to a downtime of the apparatus, wherein a manufacturing process has to be paused. Thus, a time-consuming cleaning or exchanging process of the filter element and/or the filter chamber has to be performed.

In view of the above, it is the object of the invention to provide an apparatus for additively manufacturing of three-dimensional objects having an improved filter unit allowing for a reduction of downtimes and/or a reduction of the effort of cleaning and/or changing the filter element and/or the filter chamber.

This object is achieved by an apparatus for additively manufacturing three-dimensional objects according to the claims. The dependent claims relate to possible embodiments of the apparatus according to the claims.

The apparatus described herein is an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

The apparatus comprises a number of functional units which are used during its operation. Exemplary functional units are a process chamber, an irradiation device which is configured to selectively irradiate a build material layer disposed in the process chamber with at least one energy beam, and a stream generating device which is configured to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that a particle reception chamber is provided that is separably connected or connectable to a particle outlet of the filter chamber and configured to receive the particles separated from the process gas. Therefore, the present invention suggests a filter element that separates the particles, in particular non-consolidated particulate build material and/or smoke and/or smoke residues, from the process gas, wherein the particles do not accumulate on the filter element or in the filter chamber but are received in a particle reception chamber that is connectable or connected to the filter chamber.

The particles are conveyed via the stream of process gas into the filter unit, where they come in contact with the filter element and are separated from the stream of process gas. After being separated from the stream of process gas the particles arrive in, particularly fall into, the particle reception chamber. The particles therefore, do not accumulate at the filter element and/or in the filter chamber but in the particle reception chamber. Thus, there is no need to clean and/or change the filter element as the filter element does not get filled or saturated with particles.

Further, the invention suggests separably connecting the particle reception chamber with the filter chamber so that the particle reception chamber can be separated from the filter chamber at any time. Hence, the filter chamber is merely the location in which the particles are separated from the stream of process gas but is not used to receive the particles. After the particles are separated from the process gas inside the filter chamber they arrive in the particle reception chamber, whereby the particle reception chamber can be separated from the filter chamber. If the particle reception chamber is filled to a defined degree, the connection between the particle reception chamber and the filter chamber can be closed and the particle reception chamber can be mechanically disconnected from the filter chamber, for example to clean and to empty the particle reception chamber. Self-evidently it is also possible, to change the particle reception chamber if it is filled to a certain degree therefore, providing an interchangeable system of particle reception chambers, wherein a particle reception chamber that is full or filled to a certain degree can be replaced by an empty particle reception chamber. By way of the invention it is possible, to reduce or even avoid downtimes related to the need for cleaning and/or replacing the filter element and/or the filter chamber. Further, the particle reception chamber or the particle reception chambers can be built as separate units which can be separately handled independent of the apparatus.

It is particularly possible that more than one particle reception chambers may be provided, whereby the particle reception chambers can be used successively or simultaneously, wherein for example a connection of the filter chamber to a first particle reception chamber may be closed when a fill level of the first particle reception chamber reaches a predefined level and a connection of the filter chamber to a second particle reception chamber may be opened to receive the particles separated by the filter element. The first particle reception chamber can then be mechanically disconnected from the filter unit and be cleaned and/or replaced. After cleaning and/or replacing the first particle reception chamber a fresh or the fresh first particle reception chamber may again be mechanically connected to the filter unit and as soon as a fill level of particles inside the second particle reception chamber reaches a predefined level the second particle reception chamber may be separated from the filter chamber and the first particle reception chamber may be connected to the filter chamber while the second particle reception chamber may be mechanically disconnected and cleaned and/or replaced.

According to a possible embodiment of the apparatus, the particle reception chamber is separable from the filter chamber via a separation means, in particular a valve, wherein a connection between the filter chamber and a particle reception chamber is closed, whereby the filter chamber and the particle reception chamber remain mechanically connected and/or the particle reception chamber is separable in that the particle reception chamber is mechanically disconnected from the filter chamber. According to this embodiment the particle reception chamber may be separated or connected to the filter chamber in terms of a connection between the volumes of the filter chamber and the particle reception chamber, wherein a separation means, for example a valve, may be used to separate both chambers or volumes, respectively, from each other. In this separated state the particle reception chamber can still be mechanically connected with the filter unit but it is not possible for particles to pass from the filter chamber into the particle reception chamber.

Further it is possible that in addition to the separation of the filter chamber from the particle reception chamber, the particle reception chamber may be mechanically disconnected from the filter chamber and may therefore, be moved away from the filter unit, for example to a location where the particle reception chamber may be cleaned or emptied. Self-evidently both different states of connection or separation are possible while connecting the particle reception chamber to the filter chamber so that a particle reception chamber may be merely mechanically connected but still separated in that it is not possible for particles to pass from the filter chamber into the particle reception chamber as long as the separation means is in a closed state. After the separation means is in an opened state and therefore, a connection between the filter chamber and the particle reception chamber is established, particles may pass from the filter chamber into the particle reception chamber.

According to another embodiment of the apparatus, the particle reception chamber is located below the filter chamber. Therefore, the particles separated by the filter element inside the filter chamber may fall down due to gravity and pass from the filter chamber into the particle reception chamber. Of course, it is also possible to arrange the particle reception chamber in any other position relative to the filter chamber, wherein a conveying device is used to convey the particles separated by the filter element into the particle reception chamber. By arranging the particle reception chamber below the filter chamber it is possible to use gravity to convey the particles into the particle reception chamber without additional effort. Hence, a particle outlet can be arranged bottom sides inside the filter chamber, for example below the filter element.

The apparatus can further be improved in that the filter unit comprises at least one particle guide element, in particular build as a funnel or funnel-shaped, configured to guide particles that are separated from the stream of process gas by the filter element from the filter chamber to the particle reception chamber. The particle guide element preferably is shaped in that particles falling down from the filter element onto the guide element are guided towards the particle outlet and therefore, move to the particle reception chamber. Preferably, the particle guide element is built as a funnel or funnel-shaped so that particles falling down from the filter element anywhere inside the filter chamber fall on the surface of the guide element that is sloped towards the particle outlet of the filter chamber. Additionally, it is also possible to use a conveying means to support the conveyance of particles inside the filter chamber, in particular on the surface of the guide element. Such a conveying means may be an oscillating conveyor configured to oscillate the particle guide element to support the movement of the particles towards the particle outlet and therefore, into the particle reception chamber.

Advantageously, the filter element comprises a cylindrical shape to provide a possibly large surface therefore, ensuring an effective separation of the particles from the process gas. Further, it is possible, that the filter element comprises a tapered shape on the side facing the particle outlet of the filter chamber. The filter element is arranged inside the filter chamber between a process gas inlet and at least one process gas outlet of the filter chamber in that the process gas streaming into the filter chamber has to pass the filter element before it reaches the process gas outlet of the filter chamber. By way of this embodiment it can be assured that all of the process gas passes the filter element, wherein the particles are separated from the process gas so that only cleaned process gas is recycled into the process chamber of the apparatus.

According to another preferred embodiment of the apparatus, the particle reception chamber is inseparably connected to the particle outlet of the filter units by at least one valve. Thus, the particle reception chamber may be selectively separated from the filter chamber corresponding to the opening state of the at least one valve. By providing a valve it can be assured that the inertization of the filter chamber and the particle reception chamber is upheld when disconnecting the particle reception chamber from the filter chamber. Further, it can be controlled whether particles may pass from the filter chamber into the particle reception chamber, especially when more than one particle reception chamber is connected to the filter chamber.

It is particularly preferred that the at least one valve is a split valve, in particular a split butterfly valve, and/or at least two disc valves are provided, wherein a first disc valve is controlled pneumatically and a second disc valve is controlled manually. Therefore, either the at least one valve is a split valve, wherein both the particle outlet of the filter chamber and the particle inlet of the particle reception chamber are sealed by the split valve are there are two separate valves, wherein one of the valves seals the particle outlet of the filter chamber and one valve seals the particle inlet of the particle reception chamber. In using two separate valves the valve sealing the filter chamber is preferably controlled pneumatically and the valve sealing the particle reception chamber is controlled manually.

The apparatus can further be improved in that the particle reception chamber is movable, in particular drivable, in the connected state. Hence, the particle reception chamber may be moved, for example from the position in which it is connected to the filter chamber to a position in which the particle reception chamber may be cleaned or emptied. Self-evidently, it is possible to move the particle reception chamber to any arbitrary location. In particular, the particle reception chamber may be driven, for example by an integrated drive unit, for example a motor. Hence, when the particle reception chamber is in a disconnected state, i.e. the particle reception chamber is separated and mechanically disconnected from the filter chamber it is assigned to, the particle reception chamber can be moved away from the filter unit. This allows for an efficient cleaning or emptying process, in which for example an empty reception chamber maybe moved to the filter chamber and a particle reception chamber that is filled to a certain degree is moved away for cleaning and/or emptying.

According to a preferred embodiment of the apparatus, at least one process gas outlet of the filter unit is arranged upstream of a process gas inlet of the stream generating unit. The stream generating unit therefore generates a suction stream of process gas with respect to the filter unit, wherein process gas is sucked through the filter unit and accordingly through the filter element arranged inside the filter chamber of the filter unit. The process gas that passed the filter element streams into the process gas outlet of the filter unit which is connected to a process gas inlet of the stream generating unit located downstream of the filter unit. Therefore, a closed process gas cycle can be obtained.

The apparatus can further be improved in that a passivation unit is provided that is connected or connectable with the particle reception chamber, wherein the passivation unit is configured to fill passivating material, preferably water or passivation material in powder form, into the particle reception chamber. Therefore, an oxidation of the particles separated from the process gas can be avoided since the particles inside the particle reception chamber are passivated via the passivating material. The passivating material may be filled into the particle reception chamber, for example sprayed or sprinkled in that the particles are wetted or moistened. Thereby, a safe opening of the particle reception chamber may be assured as the particles received in the particle reception chamber are passivated to reduce the risk of an explosion or a deflagration of the particles coming in contact with for example oxygen of the ambient air.

The previously described embodiment can further be improved in that the particle reception chamber comprises a fill level indicator configured to indicate a fill level of particles and/or passivating material inside the particle reception chamber. Thus, a fill level can be communicated to a user and/or a control unit to indicate if or when cleaning or replacing of the particle reception chamber is necessary. According to a signal of the fill level indicator a cleaning process and/or a change process of the particle reception chamber may be initiated by the user and/or by a control unit assigned to the apparatus.

Besides, the invention relates to a filter unit for an apparatus for additively manufacturing of three-dimensional objects by means of successive layerwise selective irradiation and consolidation of layers of a build material which can be consolidated by means of an energy beam, in particular an apparatus as described before, wherein the filter unit comprises a particle reception chamber that is separably connected or connectable to a particle outlet of the filter chamber and is configured to receive the particles separated from the process gas. Self-evidently, all features details and advantages described with respect to the apparatus are fully transferable to the filter unit.

The invention further relates to a plant for additively manufacturing of three-dimensional objects, comprising a plurality of apparatuses for additively manufacturing of three-dimensional objects by means of successive layerwise selective irradiation and consolidation of layers of a build material which can be consolidated by means of an energy beam, in particular apparatuses as described above, wherein the particle outlets of at least two filter units are connected to at least one common particle guide means connected to at least one common particle reception chamber. Self-evidently, all features details and advantages described with respect to the apparatus and/or the filter unit are fully transferable to the plant and vice versa.

Therefore, the plant comprises a plurality of apparatuses for additively manufacturing of three-dimensional objects, wherein each of the apparatuses comprises at least one filter unit with at least one filter chamber. The particle outlets of the filter chambers of the filter units are connected to at least one common particle guide means. Thus, according to this embodiment it is not necessary to provide a separate particle reception chamber for each of the filter units or filter chambers, respectively, but to provide a common particle guide means in which the particles separated by the filter elements inside the respective filter chambers arrive. The common particle guide means is connected to a common particle reception chamber in which the particles filtered by the various filter units are received. Of course, it is possible to provide a plurality of common particle reception chambers and also a plurality of common particle guide means. Hence, the connection of the filter chambers of the filter units with the common particle guide means does not have to be separable or disconnectable, but it is preferred to have a separation means in the region of the particle outlet of each filter chamber to control the amount of particles that enter the common particle guide means via each filter chamber.

Preferably the common particle reception chamber again is separable and disconnectable from the common particle guide means to ensure an efficient cleaning or emptying process of the common particle reception chamber. Thus, it is possible to separate and disconnect the common particle reception chamber to clean the common particle reception chamber and/or change the particle reception chamber, for example if a defined filling level of particles in the particle reception chamber is reached or exceeded. Therefore, the common particle reception chamber does not have to be cleaned or emptied in place, but it is possible to replace a filled common particle reception chamber with another common particle reception chamber, i.e. an empty common particle reception chamber.

The plant further preferably comprises a passivation unit configured to generate a stream of passivating material or a stream of fluid containing passivating material between an inlet of the common particle guide means to the common particle reception chamber. Therefore, the step of passivating the particles and the step of conveying the particles to the common particle reception chamber can be integrated into one process step as the passivation unit according to this embodiment is configured to create a stream of fluid containing passivating material or a stream of passivating material that can be charged with the particles entering the common particle guide means from the various particle outlets of the filter chambers of the filter units. Therefore, the particles entering the common particle guide means are received by the stream generated by the passivating unit that conveys the particles in streaming direction, wherein the particles are simultaneously passivated by coming in contact with the passivating material.

Advantageously, the particles that are separated in the filter units of the various apparatuses assigned to the plant are conveyed via the generated stream of passivating material.

Exemplary embodiments of the invention are described with reference to the FIG. The FIG. are schematic drawings, whereby FIG. 1 shows a principle drawing of an apparatus for additively manufacturing three-dimensional objects according to an exemplary embodiment;

Figure 1:
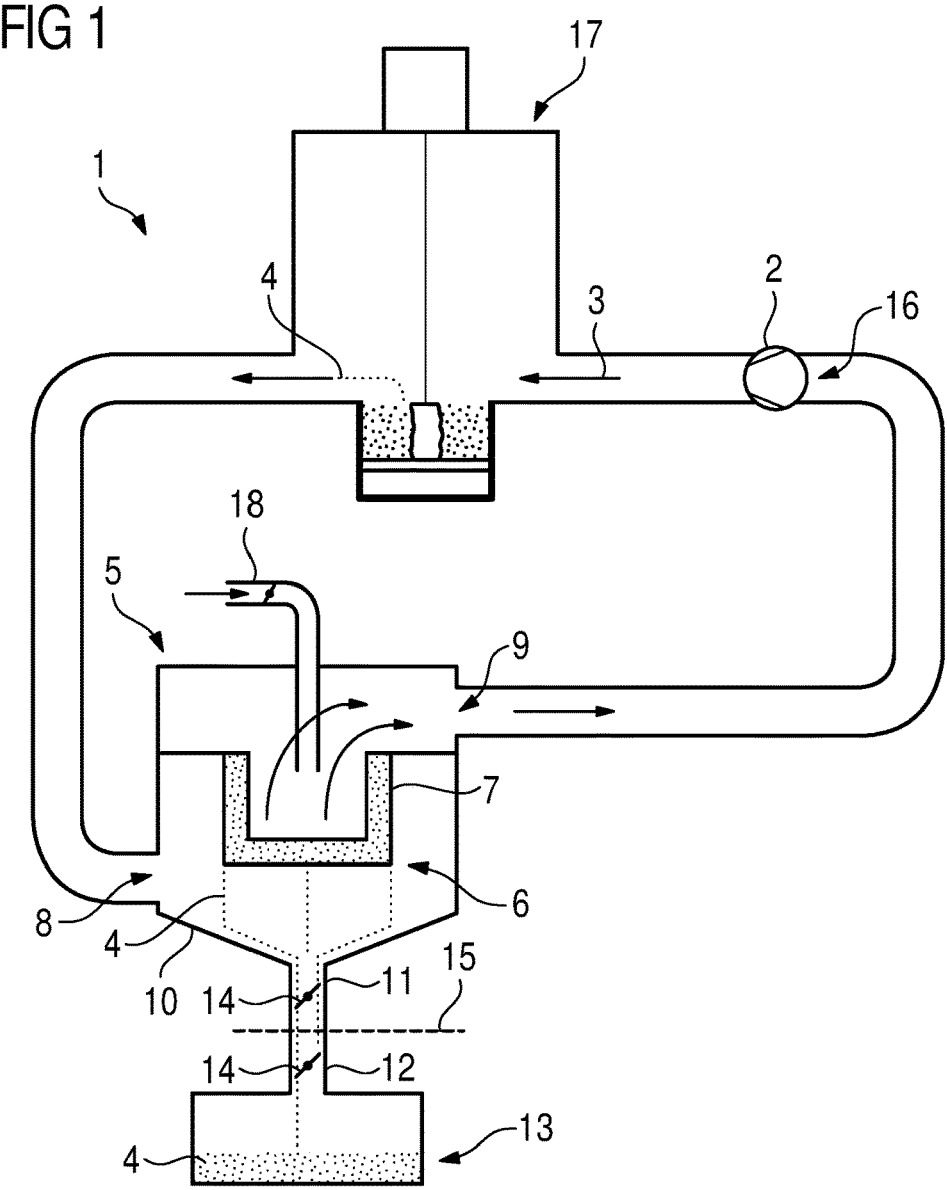

FIG. 1 shows an apparatus 1 for additively manufacturing of three-dimensional objects by means of successive layer-wise selective irradiation and consolidation of layers of a build material which can be consolidated by means of an energy beam. The apparatus 1 comprises a stream generating unit 2 configured to generate a stream of a process gas 3 (indicated by arrows) being capable of being charged with particles 4, in particular non-consolidated particulate build material and/or smoke and/or smoke residues, generated during operation of the apparatus 1 and a filter unit 5 configured to separate particles 4 from the stream of process gas 3. The filter unit 5 comprises a filter chamber 6 with at least one filter element 7 at least partly arranged in the streaming path of the generated stream of process gas 3, wherein particles 4 in the stream of process gas 3 are separated from the process gas 3 by the filter element 7.

The process gas 3 enters the filter chamber 6 via a process gas inlet 8 and exits the filter chamber 6 via a process gas outlet 9. As can be seen from FIG. 1 the filter element 7 is arranged inside the fill the chamber 6 between the process gas in that 8 and the process gas outlet 9. The filter element 7 has a cylindrical shape, wherein particles 4 that are conveyed via the stream of process gas 3 into the filter chamber 6 come in contact with the filter element 7 and are thereby separated from the stream of process gas 3. The separated particles 4 fall down due to gravity and come in contact with a surface of a particle guide element 10 that is essentially funnel-shaped. The particle guide element 10 guides the particles 4 to a particle outlet 11 of the filter chamber 6. The particle outlet 11 of the filter chamber 6 is separately connected to a particle inlet 12 of a particle reception chamber 13 of the filter unit 5.

FIG. 1 further shows that in the region of the particle outlet 11 and in the region of the particle inlet 12 a valve 14 is provided. Therefore, the connection between the filter chamber 6 and the particle reception chamber 13 of the filter unit 5 can be disconnected via the valves 14. In other words the opening or closing state of the valves 14 controls whether particles 4 can pass from the filter chamber 6 into the particle reception chamber 13 via the particle outlet 11 and the particle inlet 12.

As can further be derived from FIG. 1 the particle reception chamber 13 can be disconnected from the filter chamber 6 of the filter unit 5 (depicted via a dashed line 15). Hence, it is possible, to close the valves 14 and therefore separate the particle reception chamber 13 from the filter chamber 6. Afterwards, the particle reception chamber 13 can be mechanically disconnected from the rest of the filter unit 5 and can be moved away, for example to a station in which the particle reception chamber 13 is cleaned and/or emptied.

The stream generating unit 2 that generates the stream of process gas 3 is located downstream of the filter unit 5. In other words a process gas inlet 16 of the stream generating unit 2 is connected to a process gas outlet 9 of the filter unit 5. Therefore, the stream generating unit 2 only takes in process gas 3 that is rinsed of particles 4 via the filter unit 5. The stream of process gas 3 that enters a process chamber 17 of the apparatus 1 therefore, is free of particles 4.

Additionally the apparatus 1 depicted in FIG. 1 comprises a pressure generating means 18 located topsides of the filter unit 5 and comprises a nozzle that extends into the inside or near the filter element 7. Via the pressure generating means 18 it is possible to generate an overpressure inside the filter chamber 6 to solve particles 4 that accumulated on the surface of the filter element 7.

Figure 2:
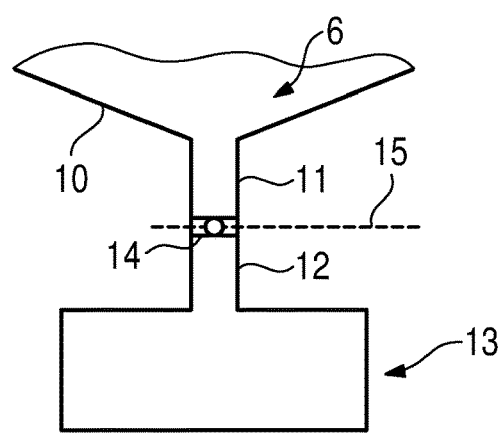
FIG. 2 shows a detail of an apparatus for additively manufacturing three-dimensional objects according to an exemplary embodiment.

FIG. 2 shows an alternative exemplary embodiment of the valve 14 in which the valve 14 is built as a split butterfly valve. Hence, the sealing of the particle reception chamber 13 and the filter chamber 6 and the mechanical disconnection of the particle reception chamber 13 from the rest of the filter unit 5 is integrated into the valve 14 being built as a split butterfly valve.

Figure 3:
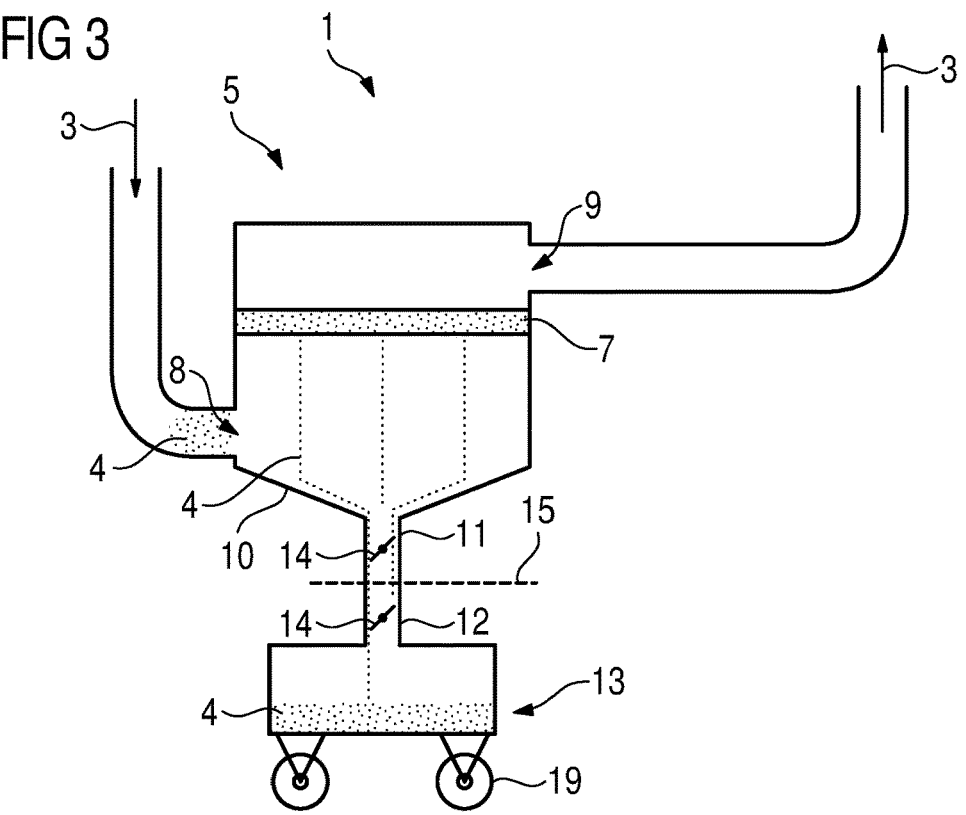
FIG. 3 shows a filter unit of an apparatus for additively manufacturing three-dimensional objects according to an exemplary embodiment.

FIG. 3 shows an apparatus 1 as described before, wherein the particle reception chamber 13 comprises moving means 19. Therefore, the particle reception chamber 13 is movable via the moving means 19, in particular drivable via a motor connected to the moving means 19. It is further possible to arrange a motor or a driving unit in general, outside or separate to the particle reception chamber 13.

Figure 4:
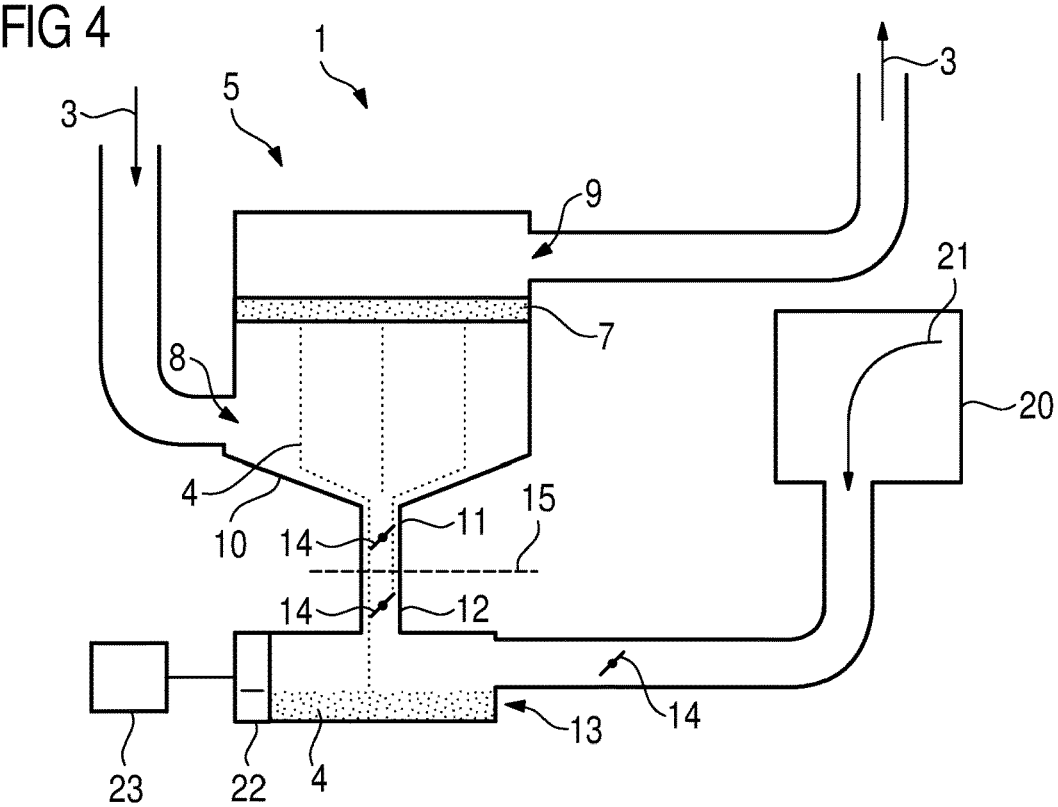
FIG. 4 shows a filter unit of an apparatus for additively manufacturing three-dimensional objects according to an exemplary embodiment.

FIG. 4 shows an apparatus 1 according to another exemplary embodiment. The apparatus 1 is basically built like the apparatus 1 as described before, therefore, the same numerals are used for the same components of the apparatus 1. Deviant from or additional to the apparatuses 1 described before the apparatus 1 depicted in FIG. 4 comprises a passivation unit 20 separably connected with the particle reception chamber 13. The passivation unit 20 is configured to fill passivating material 21 (depicted by an arrow) into the particle reception chamber 13. The passivating material 21 is preferably water, wherein any other passivating material 21 may be used that is configured to passivate the particles 4 inside the particle reception chamber 13, for example passivating material in powder form. To passivate the particles 4 inside the particle reception chamber 13 a valve 14 is provided in the connection between the passivation unit 20 and the particle reception chamber 13. Dependent on an opening state of the valve 14 the passivating material 21 can be filled into the particle reception chamber 13, for example sprayed, wherein the particles 4 can be wetted or moistened.

FIG. 4 further shows a fill level indicator 22 that is configured to indicate a fill level of particles 4 and/or passivating material 21 inside the particle reception chamber 13. The fill level indicated by the fill level indicator 22 can further be sent to a control unit 23 so that corresponding process steps can be initiated by the control unit 23, such as the initiation of a change and/or a separation of the particle reception chamber 13 from the rest of the filter unit 5. Self-evidently, the control unit 23 may also control the opening state of the valves 14 and any other component of the apparatus 1 necessary for the manufacturing cycle.

Figure 5:
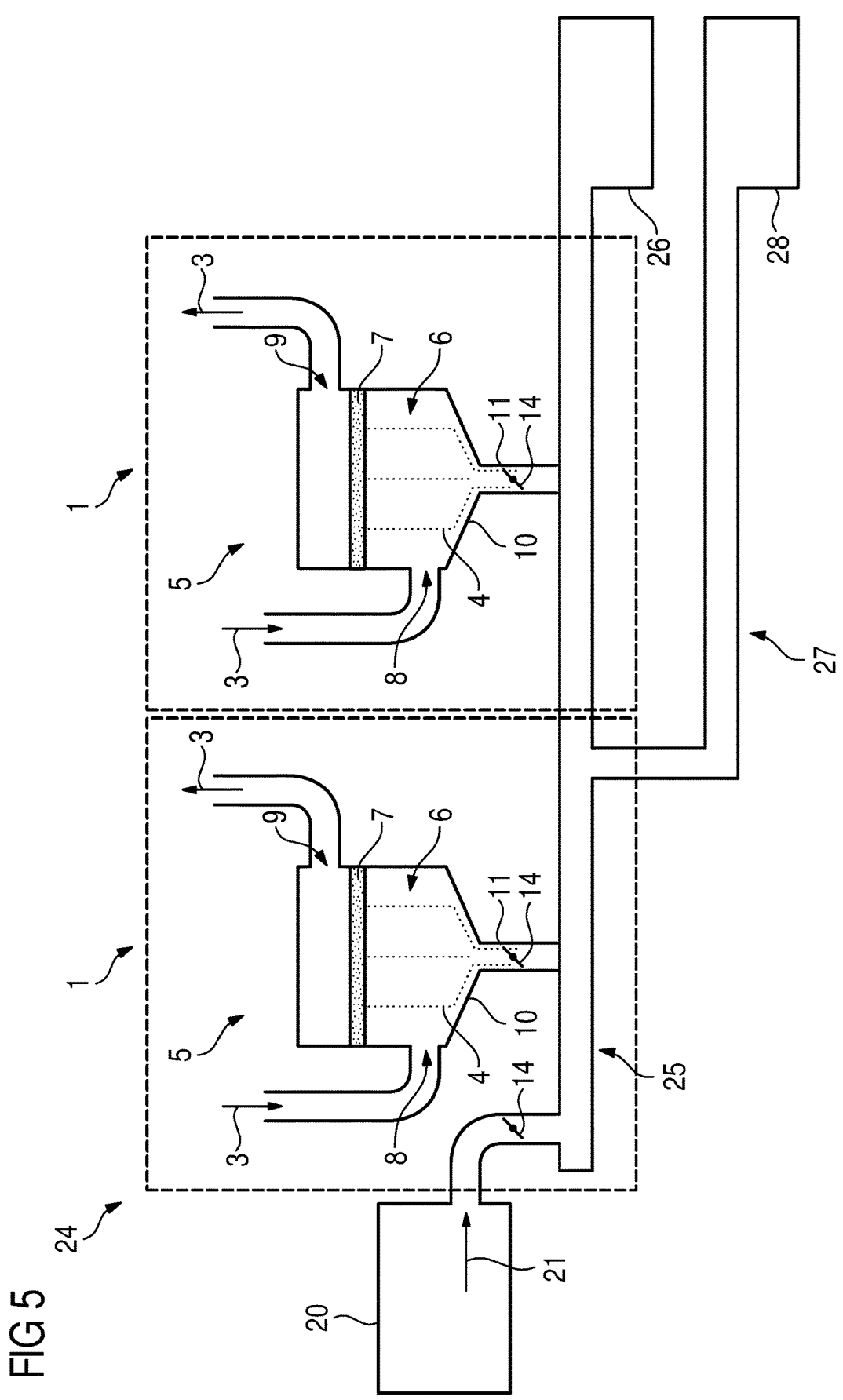
FIG. 5 shows a plant comprising two apparatuses for additively manufacturing three-dimensional objects according to an exemplary embodiment.

FIG. 5 shows a plant 24 exemplary comprising two apparatuses 1. Of course, the plant 24 can comprise a plurality of apparatuses 1 but for the sake of simplicity only two apparatuses 1 are depicted in this FIG. There are two filter units 5 assigned to the plant 24, wherein the particle outlets 11 of the filter chambers 6 of the filter units 5 are separably connected to a common particle guide means 25. The common particle guide means 25 is configured to convey the particles 4 that are filled in from the filter chambers 6 of the filter units 5 via their particle outlets 11 and are conveyed inside the common particle guide means 25 to a common particle reception chamber 26. Therefore, a passivation unit 20 is assigned to the plant 24 generating a stream of passivating material 21 and/or a stream of fluid containing passivating material 21. The passivating material 21 is filled into the common particle guide means 25 and conveys the particles 4 inserted into the common particle guide means 25 via the particle outlets 11 of the filter units 5 to the common particle reception chamber 26. Thereby, the particles 4 entering the common particle guide means 25 are not only conveyed to the common particle reception chamber 26 but are passivated at the same time as they come in contact with the passivating material 21 as soon as they enter the common particle guide means 25.

FIG. 5 shows that a second common particle guide means 27 is provided that conveys the particles 4 and the passivating material 21 to a second common particle reception chamber 28. Of course, an arbitrary amount of common particle guide means 25, 27 and common particle reception chambers 26, 28 can be provided. It is also possible, to arrange and connect the various common particle guide means 25, 27 and the various common particle reception chambers 26, 28 in an arbitrary manner.

All features, advantages and details depicted in the FIGS. 1 to 5 are arbitrarily interchangeable and transferable to all the embodiments.

The invention claimed is:

1. A system for additively-manufacturing three-dimensional objects, the system comprising:
a plurality of apparatuses respectively comprising a process chamber configured to additively manufacture three-dimensional objects by successive layerwise selective irradiation and consolidation of layers of a powdered build material;
a stream generating unit configured to generate a stream of process gas and to circulate the stream of process gas through a corresponding one of one or more streaming paths, the corresponding one of the one or more streaming paths respectively comprising a process chamber inlet and a process chamber outlet such that the process gas flows through the process chamber of a respective one of the plurality of apparatuses, thereby accumulating and removing charged particles therefrom;
a filter unit disposed along the corresponding one of the one or more streaming paths, the filter unit configured and arranged such that the process gas having accumulated charged particles flows therethrough, the filter unit thereby separating the charged particles from the process gas;
one or more particle reception chambers respectively coupled to the filter unit and/or a corresponding further filter unit by one or more particle guides, the one or more particle reception chambers configured and arranged to receive charged particles having been separated from the process gas;
a passivation unit configured and arranged to supply a passivation material to the one or more particle guides and/or the one or more particle reception chambers; and
a driving unit configured to facilitate movement of the one or more particle reception chambers.

2. The system of claim 1, comprising:
at least two filter units respectively comprising a particle outlet coupled to the one or more particle guides.

3. The system of claim 2, wherein the one or more particle guides are coupled to the one or more particle reception chambers, and wherein the one or more particle reception chambers comprises a common particle reception chamber configured to receive charged particles having been separated from the process gas flowing from at least a first process chamber and a second process chamber of respective ones of the plurality of apparatuses.

4. The system of claim 1, wherein the filter unit comprises a particle outlet and a valve configured to close the particle outlet; and/or
wherein the one or more particle reception chambers comprise a particle inlet and a valve configured to close the particle inlet.

5. The system of claim 1, wherein the filter unit comprises a particle outlet and the one or more particle reception chambers comprise a particle inlet, and wherein the one or more particle guides respectively comprise one or more valves configured to close the particle outlet and the particle inlet.

6. The system of claim 5, wherein the one or more valves configured to close the particle outlet and the particle inlet comprises a split butterfly valve or at least two disc valves.

7. The system of claim 1, wherein the one or more particle reception chambers are decouplable from the one or more particle guides.

8. The system of claim 7, wherein the one or more particle reception chambers respectively comprise a movement assembly such that the one or more particle reception chambers are movable when decoupled from the one or more particle guides, the movement assembly comprising a plurality of wheels.

9. The system of claim 1, wherein the one or more particle reception chambers respectively comprise a fill level indicator configured to indicate a fill level of particles and/or passivating material inside the respective one of the one or more particle reception chambers.

10. The system of claim 1, further comprising
a further stream generating unit configured to generate a further stream of process gas and to circulate the stream of process gas through a further corresponding one of the one or more streaming paths, the further corresponding one of the one or more streaming paths respectively comprising a further process chamber inlet and a further process chamber outlet such that the process gas flows through a further process chamber of a further respective one of the plurality of apparatuses, thereby accumulating and removing charged particles therefrom;

a further filter unit disposed along the further corresponding one of the one or more streaming paths, the further filter unit configured and arranged such that the process gas having accumulated charged particles flows therethrough, the further filter unit thereby separating the charged particles from the process gas.

11. The system of claim 1, wherein the passivating material comprises water or a powder.

* * * * *